(No Model.)
J. R. MONTGOMERY.
NUT LOCK.
No. 511,446. Patented Dec. 26, 1893.
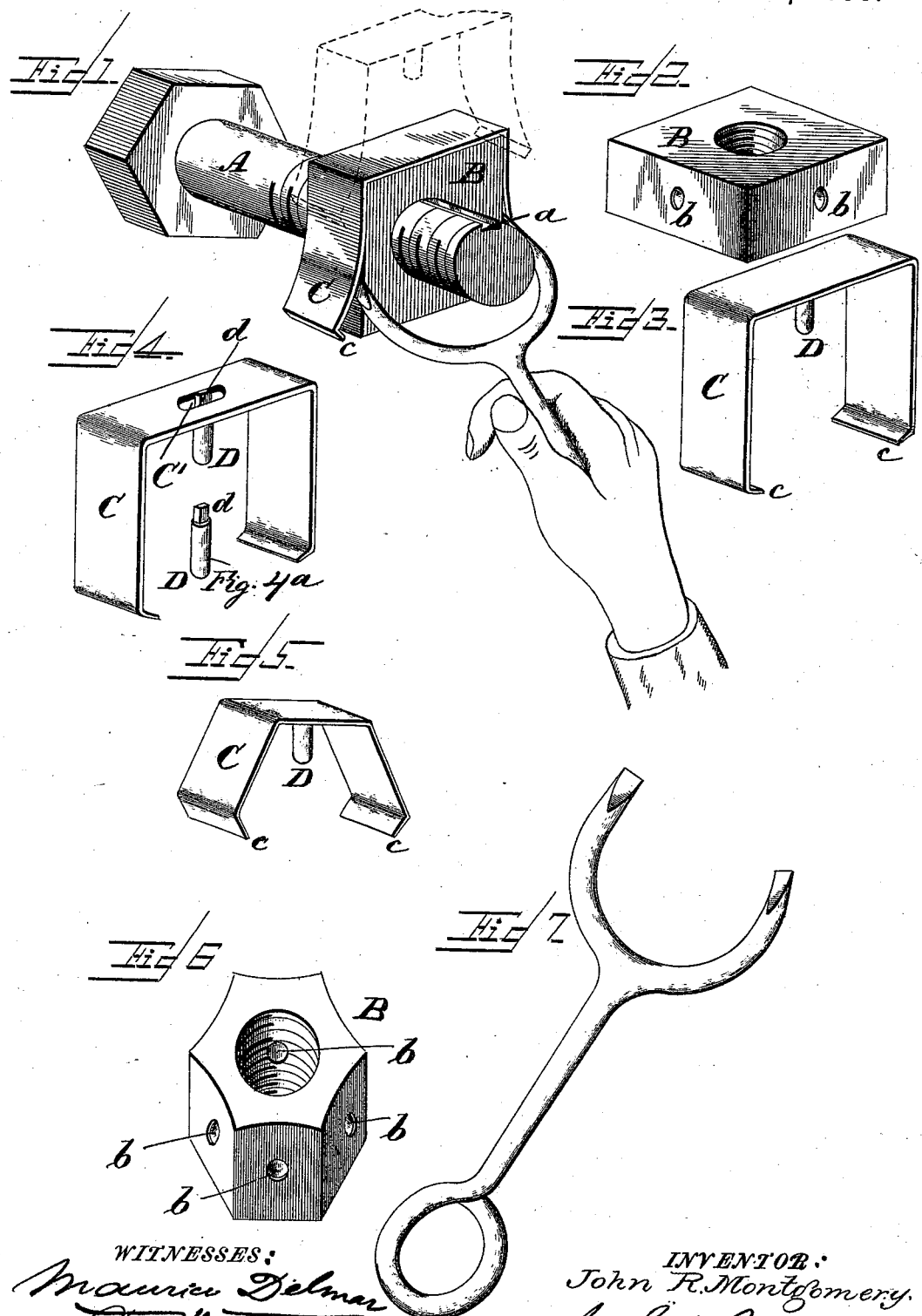

UNITED STATES PATENT OFFICE.

JOHN R. MONTGOMERY, OF HOMESTEAD, PENNSYLVANIA.

NUT-LOCK.

SPECIFICATION forming part of Letters Patent No. 511,446, dated December 26, 1893.

Application filed March 16, 1893. Serial No. 466,211. (No model.)

*To all whom it may concern:*

Be it known that I, JOHN R. MONTGOMERY, a citizen of the United States, and a resident of Homestead, in the county of Allegheny and State of Pennsylvania, have invented certain new and useful Improvements in Nut-Locks; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a bolt and nut, fitted with my improved locking device, and showing how the same is removed from the nut. Fig. 2 is a perspective view of a square nut adapted to be used in conjunction with the lock shown in Fig. 1. Fig. 3 is a perspective view of this lock, removed from the nut. Fig. 4 is a perspective view of the same locking device, but showing it of a slightly modified construction. Fig. 4$^a$ is a detail view of the detachable pin used in combination with that form of locking device which is illustrated in Fig. 4. Fig. 5 is a perspective view of a lock adapted to be used on hexagonal nuts. Fig. 6 is a perspective view of a hexagonal nut adapted for the nut lock shown in Fig. 5; and Fig. 7 is a view of the wrench or key used in removing the nut locks from the nuts.

Like letters of reference denote corresponding parts in all the figures.

This invention relates to nut locks of that type wherein the nut is locked upon the bolt by means of a pin or stud projecting from or through the nut into a groove or recess cut longitudinally in the threaded part of the bolt, and my improvement consists in the combination with the nut and slotted bolt of a peculiarly-constructed spring-lock as will be hereinafter more fully described and claimed.

Referring to the accompanying drawings, the letter A designates the bolt, and $a$ the longitudinal slot or recess in the same. The nut, B, is provided with perforations, $b$, extending from each of its sides into the screw-threaded aperture. In Fig. 2, I have shown a square nut having four of these apertures; and in Fig. 6, I have shown a perspective view of a hexagonal nut, having six of these apertures, $b$.

The locking device consists of a spring, C, of such shape that it will fit closely around the sides of the nut, so as to hug or bear against all the sides of the same, except one. This spring is provided at its open end with bent lips, $c$ $c$, which, when the spring is placed in position upon the nut, will overlap one of the sides of the nut and thereby serve, in conjunction with the "spring" of the lock, to hold the same in position upon and around the apertured sides of the nut.

Upon one of the sides of the steel band or spring, C, is fastened an inwardly projecting stud or pin, D, adapted to fit into any one of the nut apertures, $b$, and project through the same into slot, $a$, in the bolt. Instead of fastening this pin, D, permanently upon the inner side of the steel band or spring, C, it may be made separate therefrom, as illustrated in Figs. 4 and 4$^a$, in which case the band, C, is made with an oblong slot, C', into which the flattened or squared stud or tenon $d$ of the pin, D, projects, as shown in Fig. 4. The operation of the steel band or spring and its pin is, however, exactly the same, as regards the nut and the slotted bolt, whether the pin is attached permanently to the spring, or made separately therefrom.

By reference to Fig. 1, the manner of using this device will be readily understood. The nut is first screwed home upon the bolt until one of its apertures, $b$, will register with or be opposite to the longitudinal slot, $a$. The steel band, C, is then sprung over the nut, with its pin, D, projecting through one of the apertures, $b$, into the groove, $a$. When the lock is in this position, it will be seen that the nut cannot be turned or jarred off the bolt. But when it is desired to remove the nut to withdraw the bolt, the locking device, C, D, can be removed in a moment by means of the key or wrench shown in Fig. 7, by placing the same in the position illustrated in Fig. 1, so as to spread opposite sides of the band, C, apart, when the device is readily slipped off of the nut.

Having thus described my invention, I claim and desire to secure by Letters Patent of the United States—

The combination of the longitudinally slotted bolt A, the nut B, having side apertures $b$, and the band or spring C, bent into a shape to conform to the shape of the nut and provided with the inwardly projecting pin D, seated in one of the apertures in the nut and engaging with the slot in the bolt, and bent lips $c, c$, substantially as described.

In testimony that I claim the foregoing as my own I have hereunto affixed my signature in presence of two witnesses.

JOHN R. MONTGOMERY.

Witnesses:
JOSEPH CORNELL,
R. W. HADFIELD.